United States Patent [19]

Shimada et al.

[11] Patent Number: 5,662,872
[45] Date of Patent: Sep. 2, 1997

[54] PROCESS FOR CLEANING HARMFUL GAS

[75] Inventors: Takashi Shimada; Toshio Okumura; Toshiya Hatakeyama, all of Hiratsuka, Japan

[73] Assignee: Japan Pionics Co., Ltd., Tokyo, Japan

[21] Appl. No.: 560,171

[22] Filed: Nov. 17, 1995

Related U.S. Application Data

[63] Continuation of Ser. No. 236,343, May 2, 1994, abandoned.

[30] Foreign Application Priority Data

| May 11, 1993 | [JP] | Japan | 5-132719 |
| May 19, 1993 | [JP] | Japan | 5-132720 |

[51] Int. Cl.$^6$ ............ B01D 53/54; B01D 53/58
[52] U.S. Cl. ............ 423/236; 423/237; 423/210
[58] Field of Search ............ 502/406; 423/237, 423/210, 236

[56] References Cited

U.S. PATENT DOCUMENTS

| 1,559,980 | 11/1925 | Perrott et al. | 423/237 |
| 3,960,775 | 6/1976 | Piccinini et al. | 502/341 |
| 4,070,300 | 1/1978 | Moroni et al. | 423/237 |
| 4,572,178 | 2/1986 | Takase et al. | 128/205.27 |
| 4,731,333 | 3/1988 | Kitahara et al. | 436/72 |
| 5,024,823 | 6/1991 | Gökcek | 423/210 |
| 5,234,884 | 8/1993 | Mouri et al. | 423/237 |
| 5,320,817 | 6/1994 | Hardwick et al. | 423/237 |

FOREIGN PATENT DOCUMENTS

| 0 309 099 | 3/1989 | European Pat. Off. |
| 0 570 835 | 11/1993 | European Pat. Off. |
| 38 02 496 | 8/1989 | Germany |
| 52-70995 | 6/1977 | Japan | 502/406 |
| 60-227831 | 10/1985 | Japan | 502/406 |

OTHER PUBLICATIONS

"Toxisorb—Safe Disposal of Spent Process Gas", Product Document of Messer Griesheim GmbH, Industrial Gases, Dusseldorf, Germany, Copyright 1990.
Database WPI, Section Ch, Week 9329, Derwent Publications, Ltd., London, GB; Class E16, AN 93-231618 of JP-A-5 154 333, 22 Jun. 1993.

*Primary Examiner*—Michael Lewis
*Assistant Examiner*—Peter T. DiMauro
*Attorney, Agent, or Firm*—Frishauf, Holtz, Goodman, Langer & Chick, P.C.

[57] ABSTRACT

There is disclosed a process for cleaning a harmful gas which comprises bringing a gas containing a basic gas as a harmful component such as ammonia and amines into contact with a cleaning agent comprising a cupric salt supported on an inorganic carrier composed of an metallic oxide such as silica and alumina or a metallic oxide mixture of cupric oxide and manganese dioxide to remove the harmful component from the gas containing a basic gas.

According to the above process, it is made possible to effectively remove a basic gas such as ammonia and trimethylamine contained in the exhaust gas from semiconductor production process; and a harmful basic gas contained in dilution gas such as air or nitrogen which dilutes the harmful gas suddenly leaked in emergency from a gas bomb filled inside with the harmful gas. Moreover, the process enables to prevent the occurrence of fire even in the coexistence of other gas such as silane, while maintaining excellent effect on the removal of the harmful gas.

17 Claims, 1 Drawing Sheet

5,662,872

PROCESS FOR CLEANING HARMFUL GAS

This application is a Continuation of application Ser. No. 08/263,343, filed May 2, 1994 (now abandoned).

BACKGROUND OF THE INVENTION

1. Field of the Invention

The present invention relates to a process for cleaning a harmful gas. More particularly, it pertains to a process for cleaning a basic harmful gas such as ammonia, amines or the like which is used in the semiconductor manufacturing industry.

2. Description of the Related Art

With the continuous development of the semiconductor industry, the optoelectronics industry and the precision machinery and instrument industry, there has been a steady rise in recent years in the amount of basic gases such as ammonia, amines or the like which is used in such industries. The above-mentioned basic gases are each indispensable materials, in the production of a semiconductor, protective films, ultra-hard machinery and instruments, ornamentals or the like which production utilizes a chemical vapor deposition. Such gas is highly toxic and when discharged in the atmosphere, it releases an irritating odor, thus exerting adverse influence on humans and the environment.

With regard to the maximum permissible concentration of each of the gases to humans and in the atmosphere, it is reported as being 25 ppm for ammonia and 10 ppm for trimethylamine. Thus it is necessary to remove the harmful component in the gas after being used in the aforesaid semiconductor production process prior to discharge in the atmosphere.

The aforementioned basic gases are usually available on the market in the state that the gas is filled in 0.1 to 50 liters cylinder.

In order to prevent the atmospheric air from being widely polluted with a gas in case of its leakage from a cylinder, the cylinder is used in the state that it is connected to a gas supply piping to a semiconductor process while it is housed in a cylinder accommodation vessel (a so called "cylinder box") that is connected to a ventilation duct. However, even if a cylinder is housed in a cylinder box, there is no secured complete prevention of such dangerous accident that the cylinder is emptied within only about 5 to 10 minutes by a sudden leakage of the gas therefrom. Under such circumstances, there is eagerly desired a complete and thorough countermeasure capable of coping with such accident to make the harmful gas completely harmless.

As a process for cleaning a basic gas that has been discharged in the atmosphere, there are available two kinds of processes, one being a wet process in which the basic components are absorbed in an absorbing solution composed principally of an aqueous solution of an acidic component by the use of a scrubber; and the other being a dry process which make uses of activated carbon, a porous adsorbent of inorganic compound type, etc.

However, the above-mentioned wet process suffers the disadvantages that when the equipment used therefor is large-sized, it finds difficulty in post-treatment, it requires a considerable expense in the maintenance of the equipment and further that the absorption efficiency is not necessarily high, thereby making it impossible to immediately and completely treat a highly concentrated harmful gas at the present time. In addition, there are employed not only an ammonia-based gas but also other harmful gases at the same time, for example, a silicon compound-based gas typified by a silane in the semiconductor industry and thus, the wet process brings about the problem of sludge formation due to the generation of a powdery oxide.

The dry process exemplified by the above-mentioned absorptive treatment with activated carbon is disadvantageous in its low removing capacity of harmful components and further requires a countermeasure against the possible hazard of causing fire when an inflammable gas such as a silane coexits.

Such being the case, there has long been desired the materialization of a process for cleaning a harmful gas, especially that discharged from the semiconductor industry, said process being enhanced in both treatment rate and treatment capacity for harmful gas, excellent in removal performance, not only in an emergency when a large amount of a harmful gas is leaked from a gas cylinder because of an abnormality, but also in the ordinary case where a harmful gas is discharged in high concentration after being used in a semiconductor production process, and free from the possibility of causing the hazard of fire in the case of gas cleaning or clogging in a cleaning column due to sludge formation.

SUMMARY OF THE INVENTION

Under such circumstances, intensive research and investigation were concentrated by the present inventors in order to develop a process for efficiently cleaning a harmful basic gas such as ammonia, amines or the like which is exhausted from a semiconductor production process after being used therein and is contained in air, nitrogen or hydrogen, or is leaked from a gas cylinder and is contained in air or the like. As a result it has been found that the use of a cleaning agent comprising a cupric salt supported on an inorganic carrier is capable of removing the above-mentioned harmful basic gas component in extremely high efficiency and is safe. The present invention has been accomplished on the basis of the aforesaid finding.

Specifically, the present invention provides a process for cleaning a harmful gas which comprises bringing a gas containing a basic gas as a harmful component into contact with a cleaning agent comprising a cupric salt supported on an inorganic carrier to remove the harmful component from the gas.

BRIEF DESCRIPTION OF THE DRAWINGS

FIG. 3 shows a gas cylinder 3 filled with a harmful basic gas. The gas cylinder is housed in a cylinder box 4, and the air containing the harmful basic gas leaked from the cylinder is exhausted by sucking with a blower 5 through a duct 6 which is connected to the cylinder box 4 and also through a cleaning column 1 packed with a specific cleaning agent to clean the gas by removing the harmful components in the cleaning column 1.

DESCRIPTION OF PREFERRED EMBODIMENTS

Figure 1:
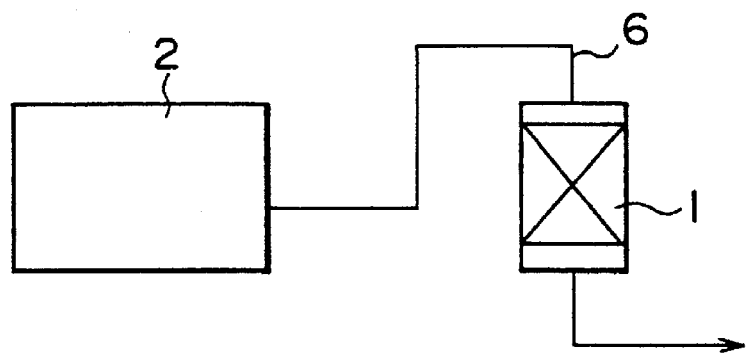
FIG. 1 is a simplified process flow diagram showing one example of a cleaning process in which a harmful basic gas which is exhausted from a semiconductor production apparatus 2 is passed through a cleaning column 1 packed with a specific cleaning agent through a duct 6 to clean the gas.

There is employed in the present invention, a cleaning agent which comprises a cupric salt supported on an inorganic carrier comprising at least one inorganic oxide such as silica, alumina, titania, zirconia, cupric oxide or manganese dioxide.

The cupric salt to be used in the present invention includes a cupric salt of an inorganic acid and that of an organic acid. Examples of the cupric salt of an inorganic acid include a cupric salt of an oxo acid exemplified by carbonic acid, silicic acid, nitric acid, sulfuric acid, phosphoric acid, aresenic acid, boric acid, chloric acid, perchloric acid, chlorous acid and hypochlorous acid; and a halogenide exemplified by cupric chloride, cupric bromide and cupric iodide. Examples of the cupric salt of an organic acid include the cupric salt of an aliphatic monocarboxylic acid exemplified by formic acid, acetic acid, propionic acid, oleic acid and stearic acid; an aliphatic dicarboxylic acid exemplified by oxalic acid, adipic acid, sebacic acid; an oxy acid exemplified by lactic acid and tartaric acid; an aromatic carboxylic acid exemplified by benzoic acid and toluic acid; and an other acid such as naphthenic acid. Of these are preferable cupric nitride, cupric sulphate, cupric chloride, cupric bromide and cupric acetate in terms of being water-soluble and easy to handle.

The above-exemplified cupric salts include an anhydrous salt and a hydrous salt ranging from monohydrate to multihydrate, of which is preferable a hydrate as compared with an anhydride in terms of handleability, stability in the air and comparability in cleaning performance.

Preferable examples of the inorganic carrier to be used in the present invention include at least one inorganic oxide selected from the group consisting of silica, alumina, titania, zirconia, cupric oxide and manganese dioxide, among which are particularly preferable silica gel, silica-alumina, alumina, mixture of cupric oxide and manganese dioxide and the like.

With regard to the specific surface area of the inorganic carrier to be used in the present invention, those each having a relatively low specific surface area are preferable, since they do not adsorb other harmful components such as silane and thus, do not exert an evil influence on the removing performance of a basic gas such as ammonia and amines. A particularly desirable carrier among them is α-alumina, which is generally available on the market and has a silica content of 0.1 to 15% by weight and a specific surface area of about 1 to 100 m²/g preferably a lower value, that is 1 m²/g or less, more preferably 0.001 to 0.5 m²/g.

A binary inorganic carrier to be used in the present invention is preferably a composition comprising cupric oxide and manganese dioxide, which may further contain a metallic oxide exemplified by at least one oxide selected from cobalt (II) oxide, silver (I) oxide, silver (II) oxide, aluminum (III) oxide and silicon (IV) dioxide in addition to the aforesaid two principal components. The content of the total sum of cupric oxide and manganese dioxide in the composition comprising said two components as the principal ones is usually 60% or more, preferably 70% or more by weight. The ratio of cupric oxide to manganese dioxide (CuO/MnO₂) is usually about 1:0.8 to 5, preferably 1:1.2 to 3 by weight.

The metallic oxide-based composition comprising the above-mentioned cupric oxide and manganese dioxide as principal components can be prepared by a publicly known method such as mixing of each component but are conveniently available on the market under the trademark HOPKALITE, which is mainly a binary composition comprising 40% by weight of cupric oxide and 60% by weight of manganese dioxide. It sometimes further contains an oxide of potassium, magnesium, aluminum, silicon or the like in an amount of about 30% by weight in addition to the aforesaid two components. At any rate, the HOPKALITE composite may be employed as such or in the form of mixture with at least one metallic oxide as described hereinbefore.

The inorganic carrier to be used in the present invention is in the form of preferably a crushed product, an extruded molding, a tableted molding or the like. The preferable size thereof is about 4 to 20 mesh for the crushed product, about 1.5 to 4 mm in diameter by 3 to 20 mm in height for the extruded molding and about 3 to 6 mm in diameter by 3 to 6 mm in height for the tableted molding which is usually cylindrical.

The amount of the cupric salt to be supported on the inorganic carrier is not specifically limited, but is properly selected according to the kind, concentration, etc. of the basic gas to be treated. In the case of the aforesaid α-alumina as an inorganic carrier, the amount of the cupric salt is 3 to 100, preferably 10 to 80 parts by weight based on 100 parts by weight of α-alumina. An amount thereof less than 3 parts by weight results in lowered cleaning efficiency, whereas that more than 100 parts by weight unfavorably leads to both difficulty in being sufficiently supported on α-alumina and expensiveness of its own.

In the case of the aforesaid HOPKALITE (cupric oxide and manganese dioxide) as an inorganic carrier, the amount of the cupric salt is 3 to 100, preferably 5 to 50 parts by weight based on 100 parts by weight of HOPKALITE. An amount thereof less than 3 parts by weight results in lowered cleaning efficiency, whereas that more than 100 parts by weight unfavorably leads to difficulty in being sufficiently supported on HOPKALITE as metallic oxides and expensiveness of its own.

It is desirable in the present invention that the cleaning agent be made to contain a small amount of free moisture in addition to the water of crystallization in the cupric salt for the purpose of enhancing the efficiency of removing harmful components. The amount of free water to be contained in the cleaning agent is preferably 1 to 50% by weight, more preferably 5 to 30% by weight based on the total amount of the cleaning agent.

The process for producing the cleaning agent to be used in the present invention is not specifically limited, but is exemplified by a process which comprises the steps of dissolving a cupric salt in warm water, impregnating a carrier such as α-alumina with the resultant solution and drying the impregnated carrier at about 30° to 100° C. to attain a prescribed water content.

The cleaning agent prepared in the above manner, especially that supported on the carrier comprising cupric oxide and manganese dioxide is advantageous in that it can decompose and make harmless not only a basic gas but also monosilase which is used in a semiconductor production process and mixed in the exhaust gas.

The concentration of a harmful gas to which the present invention is applicable is not specifically limited. It is usually 1% or lower, preferably 1000 ppm or lower by volume. The temperature of contact between the cleaning agent and the harmful gas is preferably about 0° to 90° C., but it is usually room temperature (10° to 50° C.), thus dispensing with heating and cooling. In addition, a temperature rise due to reaction heat is sometimes observed after the start of contact according to the concentration of the harmful gas. The pressure at the time of contact therebetween is usually atmospheric pressure, but the cleaning operation can be put into practice at a reduced pressure or under pressure such as 1 kg/cm$^2$G.

It is preferable that the basic gas which is the object of the present invention be introduced in the removing step as it is or after being diluted with a gas such as air, nitrogen or hydrogen. The basic gas as such or diluted with air or the like is usually in dry state, but may be in a wet state to the extent that moisture condensation is not caused. The humidity of the gas to be treated is usually from 30 to 100% relative humidity corresponds to the relative humidity of atmosphere. In such a case, the free moisture content in the cleaning agent is preferably about 5 to 30% by weight.

The cleaning process according to the present invention is not adversely influenced by carbon dioxide gas in the air or the like and as the case may be, the existence of carbon dioxide gas enhances the cleaning capability.

In the cleaning process according to the present invention, there is no specific limitation to the relation between the harmful component concentration in the gas to be treated and the flow velocity of the gas. In general however, the flow velocity is desirably lowered with increasing concentration. The concentration at which the harmful component is easily removed by the contact with the cleaning agent is usually 1% or less by volume, but can be increased in the case of a lower flow rate of the basic gas.

The cleaning agent is usually packed in a cleaning column, and the gas to be treated is allowed to flow through the column from one side thereof to the other side. The cleaning column is designed in accordance with the concentration of harmful gas, the amount of the gas to be treated, etc. The space linear velocity (LV) is preferably designed at 0.5 to 50 cm/sec for a relatively low concentration of harmful gas such as lower than 0.1% by volume, 0.05 to 20 cm/sec for a concentration of 0.1 to 1% by volume and 10 cm/sec or less for a high concentration such as 1% or higher by volume. Thus the general design criteria specify a LV value of 10 cm/sec or less in the case where a concentrated harmful gas is exhausted in a steady state from the semiconductor production process, and a LV value of 0.5 to 50 cm/sec in the case where a harmful gas is suddenly leaked from a gas bomb and diluted with a large amount of air or the like. The cleaning agent is usually packed in a cleaning column, which is generally in the form of a fixed bed and may be in the form of a mobile bed or a fluidized bed. The bulk density of the cleaning agent is preferably about 1.0 to 1.5 g/ml for a fixed bed.

The packing height of the cleaning agent in the cleaning column varies depending on the flow rate of the gas to be treated, the concentration of the harmful gas, etc., but is usually set to 50 to 500 mm, approximately from the practical viewpoint. The inside diameter of the column is designed so as to attain a LV value of 0.5 to 50 cm/sec for the gas that is passed through the column. The aforestated height and inside diameter are specifically determined taking into consideration the pressure loss through the packed bed, the contact efficiency of the gas with the packing, the concentration of the harmful gas and the like factors.

In the following, the process flow of cleaning according to the present invention will be described with reference to the drawings.

FIG. 1 is a simplified process flow diagram showing a cleaning process in which a harmful gas which is exhausted from a semiconductor production apparatus 2 is introduced into a cleaning column 1 through a duct 6, and the cleaned gas is exhausted outside.

Figure 2:
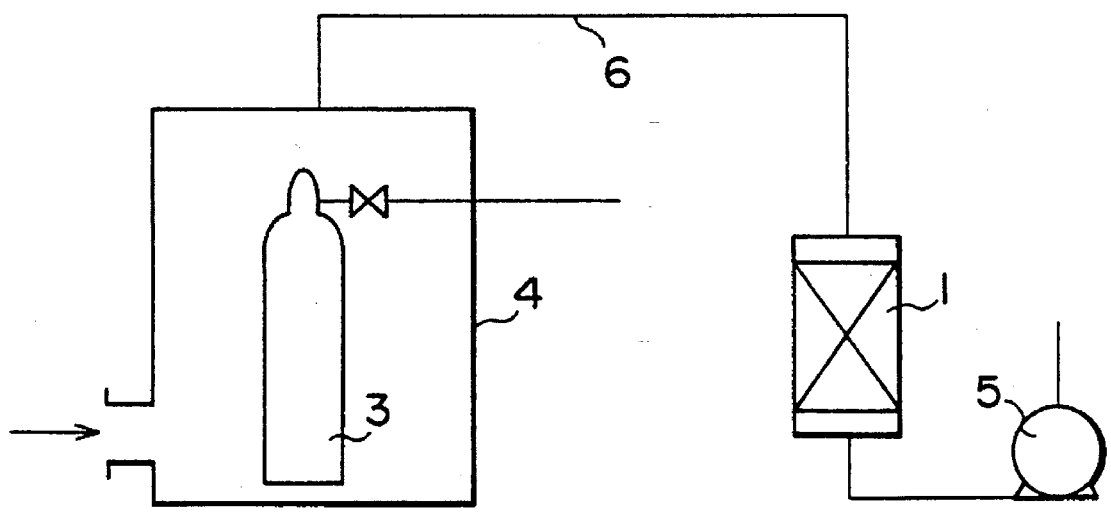
FIG. 2 is a simplified process flow diagram showing another example of a cleaning process.

FIG. 2 is a simplified process flow diagram showing a cleaning process in which a cleaning column 1 is interposed between a duct 6 connected to a cylinder box 4 that houses a harmful gas cylinder 3 and a blower 5 used for continuous suction—ventilating the air in the cylinder box 4. In this case, the gas leaked from the gas cylinder and air are introduced into the cleaning column 1 via the duct 6 by the suction function of the blower 5 which provides negative pressures inside the cylinder box 4 and the duct 6 and are passed through the column to clean the harmful gas, and the cleaned gas is exhausted at the other end of the column.

In the case of the harmful gas being in a high concentration such as higher than 1% by volume, the cleaning agent sometimes needs a heat removing means because of considerable heat generation. However according to the apparatus as shown in FIG. 2, even if sudden leak of harmful gas takes place, the gas is diluted to a concentration of 1% or less by volume with a diluting gas such as air or nitrogen. Thus, the blower is preferably installed so that it has a sufficient capacity to cope with such diluted gas in a large volume.

According to the process for cleaning harmful gas of the present invention, it is possible (i) to effectively remove a basic gas such as ammonia, monomethylamine, dimethylamine, trimethylamine, hydrazine and dimethyl hydrazine contained in the exhaust gas from a semiconductor production process as well as a harmful gas as contained in a dilution gas such as air, nitrogen or hydrogen which dilutes the harmful gas suddenly leaked from a gas cylinder and also (ii) to exert an excellent working effect. Specifically, the process enables rapid and removal of the harmful gases in large amounts at ordinary temperature regardless of the concentration, while preventing the hazard of fire even in the coexistence of other inflammable gas such as silane without exerting any adverse influence on the cleaning capability.

EXAMPLE 1 to 4

Cupric sulfate pentahydrate in an amount of 25 to 250 was dissolved in 400 to 800 ml of warm water to prepare 4 kinds of aqueous solutions of cupric sulfate each having a different concentration in a vat. Each of the resultant solutions was incorporated under mixing with 500 g of spherical α-alumina (produced by Norton Corp.) having a compositional ratio of 86% by weight of α-alumina to 12% by weight of silica, a specific surface area of 0.005 to 0.040 m$^2$/g, a bulk density of 1.1 g/ml and a diameter of 3/16 inch, followed by drying at 100° C. to prepare 4 kinds of cleaning agents each having a different cupric sulfate content and a different free moisture content as given in Table 1.

By the use of each of the cleaning agents thus prepared, a cleaning test was carried out for a harmful gas by a method wherein dry nitrogen containing one (1) % by volume of ammonia was allowed to flow through a cleaning column made of quartz glass with a 19 mm inside diameter and a 500 mm length which had been packed with 85 ml of any of the above-prepared cleaning agents, at 20° C. under atmospheric pressure at a flow rate of 170 ml/min. (equivalent to space linear velocity (LV) of 1.0 cm/sec.).

Then, the treated gas at the outlet of the cleaning column was sampled, and the sample gas was analyzed by means of a gas-detecting tube (produced by Gastech Co., Ltd. with a lower limit of detectable range of 2 ppm) as well as a gas detector (produced by Bionics Instrument Co., Ltd. model No. TG-2400 BA) to determine the period of time required for ammonia contained in the harmful gas to reach the upper limit of the permissible concentration (25 ppm) in terms of effective treatment time (min.). The results are given in Table 1.

EXAMPLE 5 to 8

The procedures in Example 1 to 4 were repeated to carry out gas cleaning test except that HOPKALITE (produced by Nissan Girdler Catalyst Co., Ltd.) comprising 40% by weight of cupric oxide and 60% by weight of manganese dioxide was employed in place of the α-alumina. The results are given also in Table 1.

TABLE 1

| Example No. | Cupric sulfate content (parts by weight per 100 parts by weight of inorganic carrier) | Free moisture content (% by weight) | Effective treatment time (min.) |
| --- | --- | --- | --- |
| 1 | 5 | 3 | 4150 |
| 2 | 10 | 3 | 5405 |
| 3 | 20 | 5 | 7023 |
| 4 | 50 | 5 | 7865 |
| 5 | 5 | 7 | 5012 |
| 6 | 10 | 7 | 6950 |
| 7 | 40 | 8 | 9005 |
| 8 | 100 | 9 | 9996 |

EXAMPLE 9 to 12

The procedure in Example 3 (cupric sulfate content of 20% by weight and free moisture content of 5% by weight) was repeated to carry out gas cleaning test except that an alteration was made to the harmful gas (ammonia) concentration and/or the space linear velocity (LV). The results are given in Table 2.

EXAMPLE 13 to 15

The procedure in Example 7 (cupric sulfate pentahydrate content of 40% by weight and free moisture content of 8% by weight) was repeated to carry out the gas cleaning test except that an alteration was made to the harmful gas (ammonia) concentration and/or the space linear velocity (LV). The results are given also in Table 2.

TABLE 2

| Example No. | Harmful gas concentration (% by vol.) | Space linear velocity (cm/sec) | Effective treatment time (min.) |
| --- | --- | --- | --- |
| 9 | 1.0 | 10.0 | 360 |
| 10 | 1.0 | 0.5 | 14023 |
| 11 | 0.1 | 10.0 | 7150 |
| 12 | 0.1 | 1.0 | 72010 |
| 13 | 1.0 | 10.0 | 901 |
| 14 | 1.0 | 0.5 | 18016 |
| 15 | 0.1 | 10.0 | 9012 |

EXAMPLE 16 to 17

The procedure in Example 3 was repeated to carry out gas cleaning test except that trimethylamine was used as the harmful component in place of ammonia, space linear velocity (LV) was varied as shown in Table 3, and a measurement was made of the period of time required for trimethylamine to reach the upper limit of the permissible concentration (10 ppm). The results are given in Table 3.

EXAMPLE 18 to 19

The procedure in Example 7 was repeated to carry out gas cleaning test except that trimethylamine was used as the harmful component in place of ammonia, space linear velocity was varied as shown in Table 3, and a measurement was made of the period of time required for trimethylamine to reach the upper limit of the permissible concentration (10 ppm). The results are given also in Table 3.

TABLE 3

| Example No. | Space linear velocity (cm/sec) | Effective treatment time (min.) |
| --- | --- | --- |
| 16 | 10.0 | 350 |
| 17 | 1.0 | 4503 |
| 18 | 10.0 | 805 |
| 19 | 1.0 | 8753 |

EXAMPLE 20 to 22

In order to evaluate the influence on the cleaning capability for a basic gas of the cleaning agent same as that in Example 3 in the case of the coexistence of a harmful gas other than the basic gas, nitrogen containing 1% by volume of monosilane was allowed to flow through the cleaning column at a definite flow rate divided into three for a period of 100 min., 1000 min., and 5000 min., respectively. Subsequently, each cleaning agent that had been preliminarily used for monosilane treatment was tested to determine the cleaning capability of ammonia in the same manner as in Example 3. The results are given in Table 4.

EXAMPLE 23 to 24

In order to evaluate the influence on the cleaning capability for a basic gas of the cleaning agent same as that in Example 9 in the case of coexistence of a harmful gas other than the basic gas, nitrogen containing 1% by volume of monosilane was allowed to flow through the cleaning column at a definite flow rate divided into two for a period of 100 min. and 1000 min., respectively. Subsequently, each cleaning agent that had been preliminarily used for monosilane treatment was tested to determine the cleaning capability of ammonia in the same manner as in Example 9. The results are given also in Table 4.

TABLE 4

| Example No. | Flow-through time for monosilane (min.) | Effective treatment time for ammonia (min.) |
| --- | --- | --- |
| 20 | 100 | 7095 |
| 21 | 1000 | 7008 |
| 22 | 5000 | 7025 |
| 23 | 100 | 8997 |
| 24 | 1000 | 8861 |

EXAMPLE 25

By the use of the cleaning agent same as that in Example 7, nitrogen containing 1% by volume of ammonia and 1% by volume of monosilane was allowed to flow through the cleaning column at a definite space linear velocity (1.0 cm/sec), and a measurement was made of the removing capability of ammonia and monosilane. As a result, the effective treatment times for monosilane and ammonia were 1600 min. and 8985 min., respectively. It has been confirmed from the above result that ammonia and monosilane can simultaneously be removed.

Comparative Example 1

The procedure in Example 5 was repeated to determine the removing capability for ammonia except that the HOPKALITE same as that in Example 5 was employed as the cleaning agent without being supported on a carrier. As a result, the effective treatment time for ammonia was only 18 min.

What is claimed is:

1. A process for cleaning a gas containing a basic gas component which comprises contacting the gas with a cleaning agent consisting essentially of a cupric salt which is at least one cupric salt of an acid selected from the group consisting of carbonic acid, nitric acid, sulfuric acid, phosphoric acid, boric acid, chloric acid, perchloric acid, chlorous acid, hypochlorous acid, hydrogen halogenide and an organic acid supported on a carrier composition of metallic oxides comprising cupric oxide and manganese oxide, said cupric salt being in an amount of 5 to 100 parts by weight based on 100 parts by weight of said carrier composition, wherein said cupric oxide and manganese oxide are contained in an amount of 60% or more by weight based on the total amount of the carrier to remove the basic gas component from the gas, wherein the cleaning agent is present in a bulk density of about 1.0 to 1.5 g/mL, and wherein the linear velocity of the gas is 0.5 to 50 cm/sec when the basic gas component is present in lower than 0.1% by volume, and the linear velocity of the gas is 0.05 to 20 cm/sec when the basic gas component is present in 0.1 to 1% by volume, and the linear velocity of the gas is 10 cm/sec or less when the basic gas component is present in higher than 1% by volume.

2. The process according to claim 1 wherein the basic gas component is at least one member selected from the group consisting of ammonia, monomethylamine, dimethylamine, trimethylamine, hydrazine and dimethylhydrazine.

3. The process according to claim 1 wherein the cupric salt is at least one cupric salt of an inorganic acid selected from the group consisting of carbonic acid, nitric acid, sulfuric acid, phosphoric acid, boric acid, chloric acid, perchloric acid, chlorous acid and hypochlorous acid.

4. The process according to claim 1 wherein the cupric salt is selected from the group consisting of cupric chloride, cupric bromide and cupric iodide.

5. The process according to claim 1 wherein the cupric salt is selected from the group consisting of (a) a cupric salt of an aliphatic monocarboxylic acid selected from the group consisting of formic acid, acetic acid, propionic acid, oleic acid and stearic acid; (b) a cupric salt of an aliphatic dicarboxylic acid selected from the group consisting of oxalic acid, adipic acid and sebacic acid; (c) a cupric salt of an oxy acid selected from the group consisting of lactic acid and tartaric acid; and (d) a cupric salt of an aromatic carboxylic acid selected from the group consisting of benzoic acid and toluic acid.

6. The process according to claim 1 wherein the carrier composition further comprises at least one further oxide selected from the group consisting of cobalt (II) oxide, silver (I) oxide, silver (II) oxide, aluminum (III) oxide and silicon (IV) dioxide.

7. The process according to claim 1 wherein the carrier composition comprises the cupric oxide to the manganese dioxide in a ratio of 1:0.8 to 5 by weight.

8. The process according to claim 7 wherein said ratio is 1:1.2 to 3 by weight and said cupric oxide and manganese dioxide are contained in an amount of 70% or more by weight based on the total amount of the carrier.

9. The process according to claim 1 wherein the basic gas component is in an amount of 1 volume % or lower.

10. The process according to claim 1 wherein the basic gas component is in an amount of 1000 ppm or lower.

11. The process according to claim 10 wherein the process is carrier out at a temperature of 0° to 90° C.

12. The process according to claim 10 wherein the process is carried out at a temperature of 10° to 50° C.

13. The process according to claim 9 wherein the basic gas component is in an amount of 0.1 volume % or lower and the linear velocity of the gas is 0.5 to 50 cm/sec.

14. The process according to claim 9 wherein the basic gas component is in an amount of 0.1 to 1 volume % and the linear velocity of the gas is 0.05 to 20 cm/sec.

15. The process according to claim 1 wherein the basic gas component is in an amount of 1 volume % or higher and the linear velocity of the gas is 10 cm/sec or less.

16. The process according to claim 1 wherein the cupric salt is in an amount of 10 to 100 parts by weight based on 100 parts by weight of the carrier composition of metallic oxides.

17. The process according to claim 1 wherein the cupric salt is in an amount of 40 to 100 parts by weight based on 100 parts by weight of the carrier composition of metallic oxides.

* * * * *